Patented Jan. 12, 1932

1,840,383

UNITED STATES PATENT OFFICE

FRITZ BAUMANN, OF LEVERKUSEN-ON-THE-RHINE, GERMANY, ASSIGNOR TO GENERAL ANILINE WORKS, INC., OF NEW YORK, N. Y., A CORPORATION OF DELAWARE

VAT DYESTUFFS OF THE ANTHRAQUINONE ACRIDONE SERIES

No Drawing. Application filed April 4, 1930, Serial No. 441,704, and in Germany April 9, 1929.

The present invention relates to new dyestuffs of the probable formula:

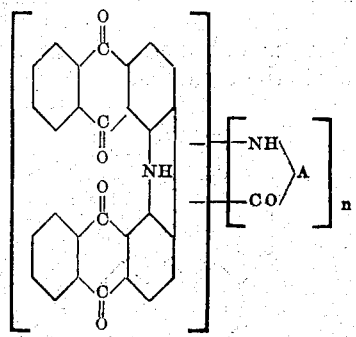

wherein A means anthraquinone to which the —NH— and —CO— groups are attached by adjacent carbon atoms, n one of the numbers 1 or 2 and wherein the —NH— group is attached to an alpha-position of the dianthraquinonyl amine-carbazole ring system and the —CO— group to the adjacent beta-position.

In accordance with the invention dyestuffs of the above mentioned formula are obtainable by reacting upon an alpha-amino- or alpha-alpha-diamino-1.1′ - di - anthraquinonyl-amine-carbazole with an ortho-halogen-anthraquinone-carboxylic acid, such as 1-chloroanthraquinone-2-carboxylic acid, 2-bromoanthraquinone-1-carboxylic acid, 2-chloroanthraquinone-3-carboxylic acid and the like, or more advantageously with an ester of such carboxylic acid, such as methyl ester, ethyl ester, etc. We prefer to perform the reaction by heating the reaction components in a suitable high boiling organic solvent, such as trichloro benzene, nitro benzene, naphthalene, or the like in the presence of an acid binding medium with or without the addition of small amounts of copper or a copper salt. After reaction is complete the reaction product (a tri- or tetra-anthraquinonylamine- carbazole-carboxylic acid or an ester thereof) is isolated in the usual manner and heated with conc. sulfuric acid advantageously to about 90–100° C. whereby acridone ring closure occurs.

The products thus obtainable which probably correspond to the general formula as given in the statement of invention form reddish-brown to black powders, difficulty soluble or almost insoluble in the usual organic solvents, soluble in strong sulfuric acid with red to bluish-green colorations, dyeing cotton from an alkaline hydrosulfite vat red to olive-green shades of excellent fastness to light, being at the same time weatherproof and possessing a good evening color. They are furthermore valuable dyestuffs for printing textile fibers.

The following examples illustrate my invention without restricting it thereto, the parts being by weight.

Example 1

4,4 parts of 4-amino-1.1′-dianthraquinonyl-amine-carbazole (obtainable by saponification of 4-benzoylamino-1.1′-dianthraquinonylamine carbazole), 3,6 parts of 2-bromo-anthraquinone-1-carboxylic acid methyl ester, 3 parts of water free potassium acetate, 1,4 parts of magnesium oxide and 0,2 part of copper acetate are introduced into 80 parts of naphthalene and the mixture is heated to about 215° C. until no more unchanged 4-amino-1.1′-dianthraquinonylamine-carbazole is present. Hereafter about 200 parts of toluene are added, the reaction product is sucked off at about 90° C., washed with toluene and ethyl alcohol and boiled up with diluted hydrochloric acid. After drying dark olive crystals dissolving in nitro benzene with a dull green coloration are obtained, yielding a yellowish-brown hydrosulfite vat.

When dissolving this intermediate product in sulfuric acid of 96% strength an olive colored solution is first obtained, which changes to bluish-red after heating to about 100° C. whereby acridone ring closure occurs.

When pouring the solution onto ice an olive green compound separates which is sucked off, washed with water until neutral and dried. The product thus obtainable probably corresponds to the formula:

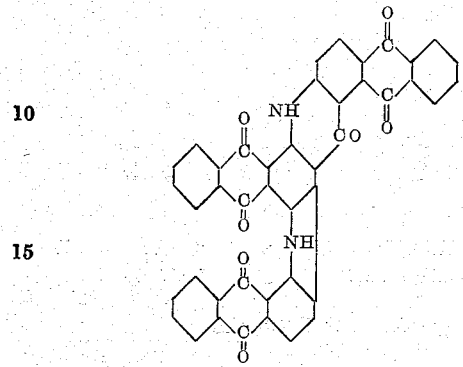

It dyes cotton from a dull red alkaline hydrosulfite vat strong olive-green shades of excellent fastness properties and is almost insoluble in the usual organic solvents.

*Example 2*

4,6 parts of 4,4'-diamino-1.1'-dianthraquinonylamine-carbazole (obtainable by saponification of 4.4'-di-(benzoylamino)-1.1'-dianthraquinonylamine-carbazole), 8 parts of 2-bromoanthraquinone-1-carboxylic acid methyl ester, 5 parts of water free potassium acetate, 3 parts of magnesium oxide and 0,3 part of copper dust are boiled in 120 parts of naphthalene until no more unchanged 4.4'-diamino-1.1'-dianthraquinonylamine-carbazole is present. After cooling toluene is added, the reaction product filtered, washed first with toluene then with alcohol and dried. A black crystallized intermediate product is thus obtained, soluble in boiling nitro benzene with an olive coloration.

When dissolving the product in sulfuric acid of 96% strength an olive colored solution is obtained, the color of which changes to bluish-green when heating whereby acridone ring closure occurs. After working up in the usual manner the reaction product which probably corresponds to the formula:

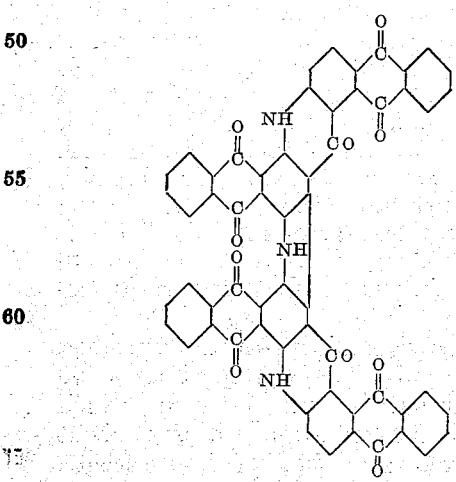

is obtained in form of a black powder almost insoluble in the usual organic solvents, yielding green flakes when redissolved from sulfuric acid. The product dyes cotton from an alkaline hydrosulfite vat olive-green shades, which are greener than those obtainable with the product of Example 1. The dyestuff may be applied as well for dyeing as for printing purposes.

*Example 3*

4,2 parts of 5.5'-diamino-1.1'-dianthraquinonylamine carbazole (obtainable by saponification of the corresponding dibenzoyl compound), 6,7 parts of 1-chloroanthraquinone-2-carboxylic acid methyl ester, 5 parts of water free sodium acetate, 2 parts of magnesium oxide and 0,3 part of copper acetate are boiled for 3-4 hours with 100 parts of naphthalene. After dilution with pyridine reddish-brown crystals separate, dissolving in trichlorobenzene with a reddish-brown coloration. Acridone ring closure can be performed as described in Example 1 or 2. A product is thus obtained, which probably corresponds to the formula:

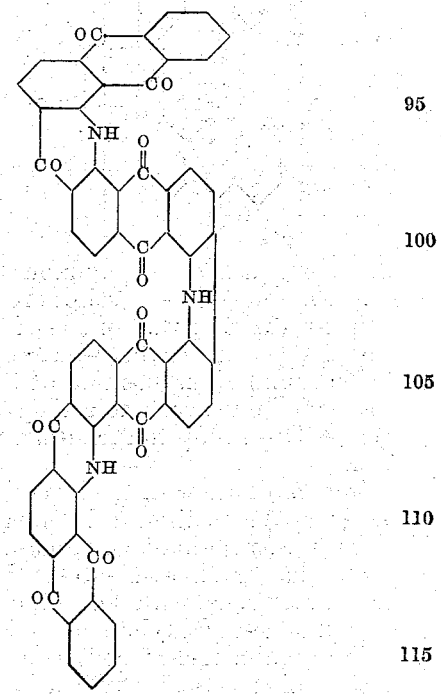

It dissolves in strong sulfuric acid with a reddish-brown coloration, is difficultly soluble in the usual organic solvents and dyes cotton from a greyish-violet hydrosulfite vat blackish-brown shades of good fastness properties.

*Example 4*

3 parts of 5.5'-diamino-1.1'-dianthraquinonyl-amine-carbazole, 4.2 parts of 2-chloroanthraquinone-3-carboxylic acid methyl ester, 4 parts of water free potassium acetate and 0,2 part of copper dust are boiled with 80 parts of naphthalene for 4-5 hours. The reaction product is isolated as described in the foregoing examples and closure of the acridone ring is performed by heating with conc. sulfuric acid to about 100° C. After working up in the usual manner and drying a dark brown powder is obtained, which dissolves in strong sulfuric acid with a brown coloration and dyes cotton from a brown hydrosulfite vat reddish-brown shades. The product probably corresponds to the formula:

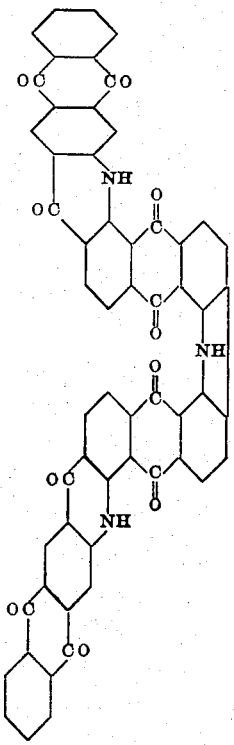

I claim:—
1. The products of the probable general formula:

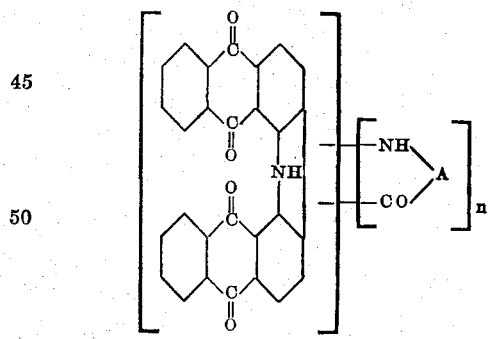

wherein A means anthraquinone to which the —NH— and —CO— groups are attached by adjacent carbon atoms, n one of the numbers 1 or 2 and wherein the —NH— group is attached to an alpha-position of the dianthraquinonyl-amine-carbazole ring system and the —CO— group to the adjacent beta position, said products being reddish-brown to black powders difficultly soluble in the usual organic solvents, soluble in strong sulfuric acid with red to bluish-green colorations, dyeing cotton from an alkaline hydrosulfite vat red to olive-green shades of good fastness properties.

2. The product of the probable formula:

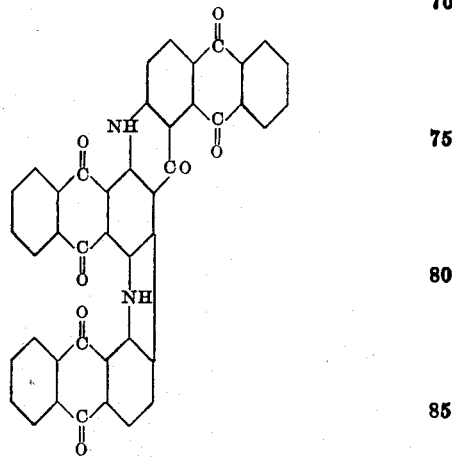

said product forming olive-green flakes, dyeing cotton from a dull red alkaline hydrosulfite vat strong olive-green shades of excellent fastness properties.

In testimony whereof, I affix my signature.
FRITZ BAUMANN.